June 16, 1964     E. KÄDING     3,137,339
GAS VALVE WITH ELECTRIC IGNITING MEANS
Filed Aug. 31, 1960
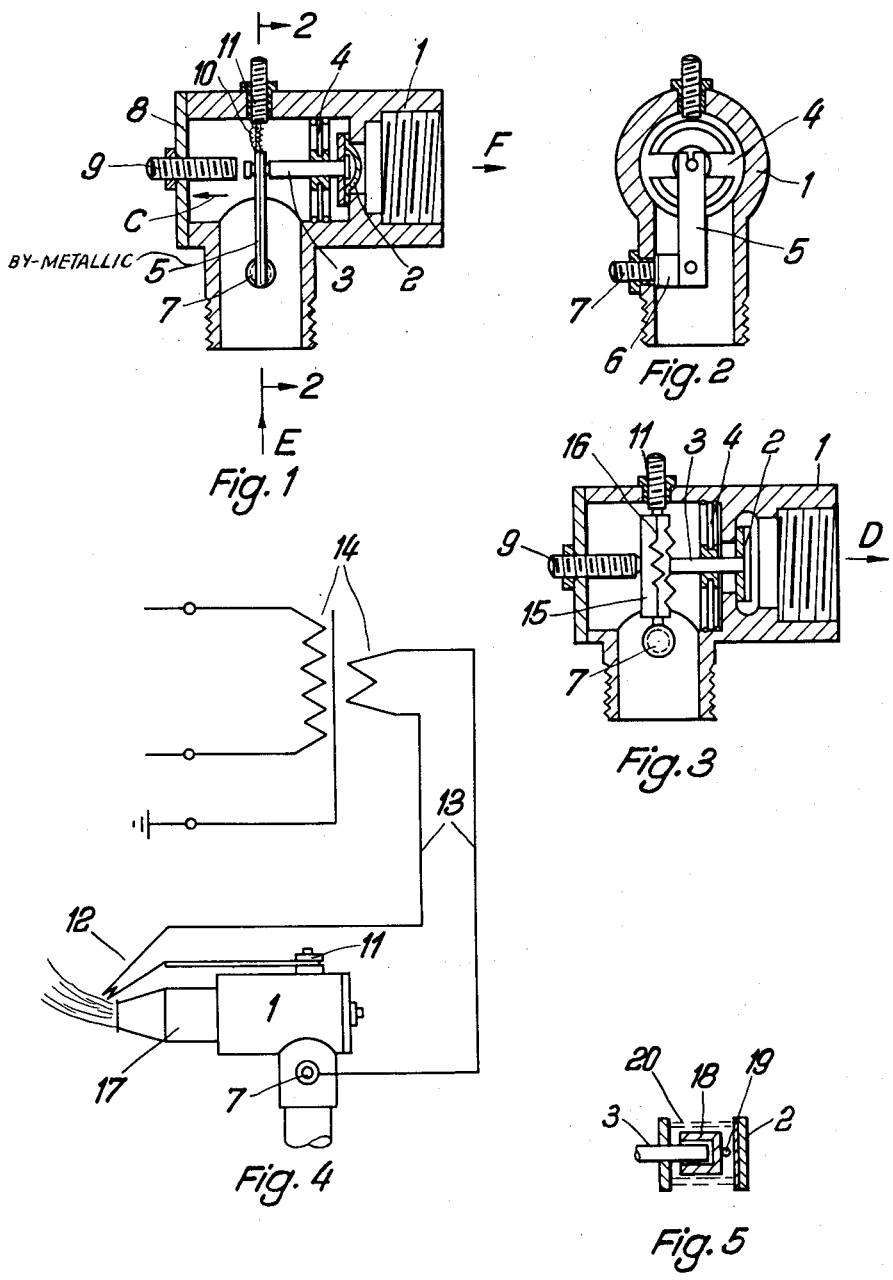
Inventor:

United States Patent Office 3,137,339
Patented June 16, 1964

3,137,339
GAS VALVE WITH ELECTRIC IGNITING MEANS
Erhard Käding, 383 Sulldorfes Landstrasse,
Hamburg-Rissen, Germany
Filed Aug. 31, 1960, Ser. No. 53,141
4 Claims. (Cl. 158—124)

The present invention relates to a gas valve controlled by a temperature responsive switching device, mounted inside the gas main.

The hitherto known constructions of such valves, have the disadvantage that they react comparatively slowly, since the heating and cooling of the switching device, which serves for their operation, is not effected quickly enough.

According to the present invention the switching device, which is mounted inside the gas stream and which, on being heated, opens and keeps open the valve, is heated by external energy.

Preferably this energy can be introduced to the switching element in the form of electrical energy, but also other types of energy can be used for heating the switching element.

In a preferred embodiment the switching device is mounted inside a valve box in operative connection with a valve cap, and is connected in an electrical circuit to be heated by the passage of current, which switching device serves to open and keep open the valve when the current is switched on, as well as to shut the valve when the current is switched off again, this closure being effected by the cooling of the fuel, which flows through the valve and serves as a cooling agent when the valve is open.

In a further preferred embodiment there is mounted on a valve stem of the valve cap, a snap-acting spring which serves for storing the energy of the temperature responsive switching device and which effects an abrupt opening and shutting of the valve. In such a construction it may be arranged that the abrupt opening can be effected in various phases.

The temperature responsive switching device may comprise a bimetallic strip, or a membrane provided with means which expands on heating and contracts on cooling, particularly liquid or gaseous means, or any other device which effects some motion in response to changes in temperature.

The valve according to the invention has the advantage that it opens and shuts considerably faster than the known valves and switching devices which have hitherto been used for such purposes.

Specific embodiments of the invention will now be described by way of example with reference to the accompanying drawing, in which:

FIGURE 1 is a longitudinal section through a first embodiment,

FIGURE 2 is a section on the line 2—2 of FIGURE 1,

FIGURE 3 is a longitudinal section through another embodiment,

FIGURE 4 is a view of a valve embodying the invention as well as a diagram of the electrical device, and FIGURE 5 is a detail view of a modification.

In all the figures like parts are denoted by like reference numerals.

According to the construction as shown in FIGURES 1 and 2, there is mounted in a valve box 1 an axially movable valve cap 2, whose stem 3 bears a snap-acting spring 4 which also serves as a guide. The snap-acting spring 4 is rigidly mounted on the box 1. A switching element, which in FIGURES 1 and 2 is constructed as a bimetallic strip 5, is connected to the valve stem 3. This bimetallic strip 5 is mounted on a bar 6 which has a screw stem 7 by means of which the bar 6 is attached to the box 1. An adjusting screw 9, which serves as a stop for the valve cap 2, is mounted in the rear wall 8 of the box 1.

The bimetallic strip 5 conducts electricity and is connected, by means of a wire 10, to a clamping screw 11, which is mounted in the box 1. An ignition device 12 is connected to the clamping screw 11 and to one of the output leads 13 of a transformer 14. The other output leads 13 of the transformer is connected to the screw 7.

The construction shown in FIGURE 3 largely corresponds to the construction shown in FIGURE 1, the difference being that there is mounted on the end of the valve stem 3 a membrane casing 15 which is filled with a liquid or gaseous means which expands on heating and contracts on cooling. A resistance or heating wire 16 passes through this membrane casing from the clamping screw 11 to screw 7, and serves to heat the means which is contained in the membrane casing 15. Furthermore, as viewed in the direction of the current, the valve cap 2 is not mounted, as in FIGURE 1 in front, but behind the valve seat.

When the transformer 14 is switched on, the current flows from the clamping screw 11 through the wire 10 or 16 and the switching element to the clamping screw 7 or vice versa. Thus the heating of the bimetallic strip 5, or of the means contained in the membrane casing 15, is effected. Due to this heating, the bimetallic strip bends in the direction of the arrow C, FIGURE 1, or the membrane casing 15 expands in the direction of the arrow D, FIGURE 3. Due to this movement, the valve cap 2 is lifted from the valve seat, so that the fuel which streams into the valve box in the direction of the arrow E, FIGURE 1, leaves it in the direction of the arrow F and escapes through a nozzle 17, which is detachably connected to the valve box 1, for example by screwing. This emerging fuel spray is ignited by the ignition device 12.

Before the opening process, described above, sets in, the snap-acting spring 4 is tightened due to the motion of the bimetallic strip 5 or the expansion of the membrane casing 15. Once this tension exceeds a certain limit, the snap-acting spring bends and consequently the valve cap 2 is lifted abruptly from its seat. The fuel, which now flows through the valve, cools the bimetallic strip 5 or the membrane casing 15. This cooling is effected until the energy of the bimetallic strip 5 or of the membrane casing 15 only just suffices to keep the valve cap 2 open. If the ignition device 12 is switched off, it takes only a few more seconds for the temperature of the bimetallic strip 5 or the membrane casing 15 to drop to such an extent that the snap-acting spring returns to its initial position and consequently the valve cap 2 is abruptly pressed back onto its seat.

The valve may be adjusted by means of the clamping screws 7 and 11.

The invention is not limited to the illustrated constructions. For example, the snap-acting spring 4 may be omitted. In this case the valve is opened gradually and not abruptly. Furthermore, it can be arranged that the switching element, for example the bimetallic strip 5 or the membrane casing 15 is not surrounded by the fuel when the valve cap 2 is shut. Thus, for example, the inlet opening may be provided in the outlet of the box 1 with a valve cap which only opens when the valve cap 2 is opened. In this case the switching element no longer lies in the inlet piece.

It is also possible to delay the opening process of the valve until the spring bends. For this purpose, the valve disc 2 is not rigidly connected to the snap-acting spring 4, but an interval is provided between the valve disc 2 and the spring 4, for example as shown in FIGURE 5, by mounting the valve stem 3 on the end of a sleeve 18 on which a shoulder 19 of the valve disc can perform a limited reciprocal movement, the disc being retained in its position by a pressure spring 20, which holds the valve disc as far away from the stem as possible. In this manner, the use of an additional delaying relay becomes unnecessary.

What I claim is:

1. A valve of the class described comprising a valve body providing a combustible fluid passage, a valve seat in said passage transversely thereof, a valve seatable on said seat, said valve having a valve stem fixed thereto axially of said passage for reciprocal movement with said valve to seat and unseat the latter, said stem having a free end, a guide for said stem, said guide comprising a snap-action spring extending transversely of said passage, said spring being fixed to said stem between said valve and said free end of said stem for positive actuation of said stem and valve in either direction, a thermally responsive element in said passage, means connecting said element to said free end of said stem for loading the latter to actuate said spring to seat and unseat said valve with a snap action, electric heating means for said element, transformer means for selectively supplying or cutting off heating current to said heating means, heating of said element being operative to load said stem in a valve opening direction, fluid flowing through said passage with said valve open being operative to cool said heated element to point just above that necessary to urge said element in a valve seating direction, whereby seating of the valve is accelerated upon cutting off of heating current to said element and means for varying the position of said thermally responsive element relative to said valve stem.

2. A valve according to claim 1, wherein said element comprises a bimetallic strip having a free end connected to said free end of said stem.

3. A valve according to claim 1, wherein said element comprises a chamber enclosing said heating means and being filled with an expansible fluid, said chamber including a wall movable in response to expansion or contraction of said fluid, and means connecting said wall to said free end of said stem.

4. A valve according to claim 1, there being an electric igniting means for said fluid, and means operatively connecting said igniting means to said heating means in series.

References Cited in the file of this patent
UNITED STATES PATENTS

| | | |
|---|---|---|
| 389,151 | Hogan | Sept. 4, 1888 |
| 829,810 | Swan | Aug. 28, 1906 |
| 1,265,765 | Farris | May 14, 1918 |
| 1,566,056 | Westerfield | Dec. 15, 1925 |
| 1,781,328 | Grayson | Nov. 11, 1930 |
| 1,875,513 | Smith | Sept. 6, 1932 |
| 1,882,726 | Atkins | Oct. 18, 1932 |
| 1,981,299 | Beckler | Nov. 20, 1934 |
| 2,118,443 | McCorkle | May 24, 1938 |
| 2,164,511 | Furlong | July 4, 1939 |
| 2,187,045 | McCorkle | Jan. 16, 1940 |
| 2,484,405 | Eskin | Oct. 11, 1949 |
| 2,489,794 | Main | Nov. 29, 1949 |
| 2,803,495 | Ray | Aug. 20, 1957 |
| 2,944,596 | Sagar | July 12, 1960 |
| 3,004,713 | Thorsheim | Oct. 17, 1961 |